Feb. 23, 1971   B. Z. MEERS, JR   3,566,263
DIGITAL NOTCH FILTER
Filed May 7, 1968   13 Sheets-Sheet 1

INVENTOR.
BENJAMIN Z. MEERS, JR.
BY
*G M Coy*
*William H. King*
ATTORNEYS

Feb. 23, 1971     B. Z. MEERS, JR     3,566,263

DIGITAL NOTCH FILTER

Filed May 7, 1968     13 Sheets-Sheet 2

INVENTOR.
BENJAMIN Z. MEERS, JR.
BY
William H. King
ATTORNEYS

Feb. 23, 1971  B. Z. MEERS, JR  3,566,263
DIGITAL NOTCH FILTER

Filed May 7, 1968  13 Sheets-Sheet 9

INVENTOR.
BENJAMIN Z. MEERS, JR.
BY
William H. King
ATTORNEYS

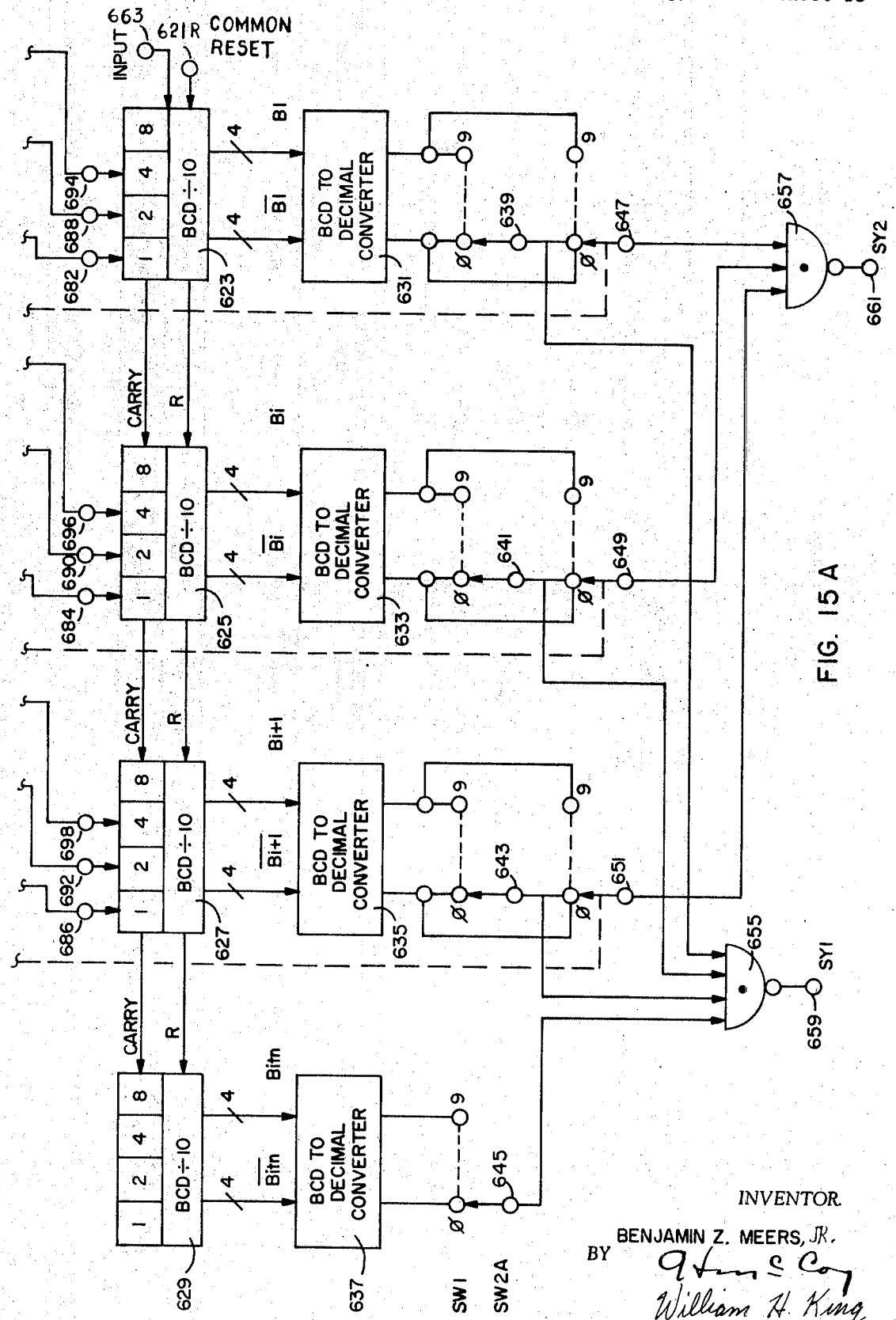

एक # 3,566,263
DIGITAL NOTCH FILTER
Benjamin Z. Meers, Jr., 12150 Parklawn Drive,
Rockville, Md. 20852
Filed May 7, 1968, Ser. No. 727,177
Int. Cl. G01r 23/02
U.S. Cl. 324—78                                   6 Claims

ABSTRACT OF THE DISCLOSURE

A digital device for determining if the time period of an incoming signal coincides with a time period set in the device, for determining if the frequency of the incoming signal is high or low as compared to the device's resonant frequency, and for digitally indicating the frequency deviation of the incoming signal from the resonant frequency of the device.

The invention described herein was made by an employee of the United States Government and may be manufactured and used by or for the Government for governmental purposes without the payment of any royalties thereon or therefore.

The invention relates generally to a digital notch filter and more specifically concerns a digital notch filter which measures the frequency deviation of an incoming signal from the resonant frequency of the filter.

The invention receives a periodic electrical signal from a microphone, radio, power source, oscillator, or other electrical or electronic source and compares the signal's electrical period with a time standard in the filter, giving an indication if the time periods coincide within a specified time tolerance.

The invention also detects the condition where the time period of the filter and that of the incoming signal do not match and gives indications, over an extremely wide range, if the incoming signal frequency is high or low as compared to the filter's time standard.

In addition, the invention indicates, digitally the frequency deviation of an input signal from the resonant frequency of the filter within the limits of minus 30 percent to plus 30 percent.

Several methods of electronic filtering have been devised for monitoring a signal of one frequency within a given passband. The most accurate filter is the relatively well known digital gate filter whose operation will be described with the aid of FIGS. 1 through 5 of this disclosure. Refering now to FIG. 1 wherein the logic of the digital gate filter is illustrated, the input signal SI to Schmitt trigger 10 is a sine wave or series of pulses of one fundamental frequency. Schmitt trigger 10 produces an output signal S which has fast rise and fall times and the same fundamental frequency as input signal SI. Signal S triggers monostable multivibrator 11 which produces a short duration pulse SP for each true transition of S. The true or "1" output terminal of monostable multivibrator 11 is connected to the trigger terminal of triggerable bitable multivibrator 13 which changes state for each true transition of SP, or every SP pulse. Bistable multivibrator 13 produces a square wave ST which is used to gate the SP pulses through AND gate 15 at one half the frequency of the input signal SI. AND gate 15 produces pulse DT which appears every other SP pulse and is coincident with the SP pulses. Pulse DT is used to trigger monostable multivibrator 17 on the leading edge of DT. Monostable multivibrator 17 is the timing element of the filter and has a delay period equal to the period of SI minus one half the period of gate pulse DP. The trailing edge of delay pulse D triggers monostable multivibrator 19 which produces gate pulse DP whose duration is the passband of the filter. AND gate 21 produces an output resonance indication SY only if pulses SP and DP are coincident in time. This output of the filter indicates that the period of the input signal SI and the period of the filter are the same within the time tolerance of gate pulse DP. The pulse timing relationships of this filter for a coincidence or resonance output indication are as illustrated in FIG. 2 of this disclosure.

The digital gate filter has several disadvantages:

A period of input SI which is slightly longer than that of the filter such that SP is true during the trailing edge of gate pulse DP will cause a false coincidence indication as illustrated in FIG. 4 of this disclosure.

A period of input SI which is slightly shorter than that of the filter such that SP is true during the leading edge of gate pulse DP will also cause a false coincidence or resonance indication as illustrated in FIG. 5 of this disclosure. These error conditions may be compared to an ideal resonance indication as illustrated in FIG. 3 of this disclosure.

Any harmonic of the fundamental frequency of the filter may cause a false resonance indication SY.

Any frequency input to the filter which is above about 1.7 times the fundamental frequency of the filter will exceed the permitted duty cycle of the filter's monostable multivibrator 17 of FIG. 1 of this discloseur and will either significantly change the resonant frequency of the filter or cause false triggering. In either case, this will resulit in false resonance indications from this filter.

Inductance-capacitance resonant circuits and a resistance-capacitance resonant circuit are used as filters for indicating one particular frequency. These filters have the disadvantages that their components are usually large and are required to be of exceptionally high quality for narrow bandwidth use at audio or subaudio frequencies. The "Q" of these filters at any frequency below RF is low as compared to a digital filter, and filters of this type are difficut to tune to a different frequency or bandwidth (e.g. 0.6 or 1.5 times the original frequency or bandwidth).

Synthetic inductance-capacitance resonant circuits, or active filters may be used for indication or filtering of one specified frequency. These filters have the disadvantages that their "Q" at audio and subaudio frequencies is higher than passive filters but lower than digital filters, and they have a tendancy to be unstable.

An electronic counter may be constructed with provisions for indication of the presence of one specified input signal frequency or indications of high of low conditions if the input signal frequency is different from the counter settings. This type of filter has many disadvantages:

No provisions are made for the indication of a given band of frequencies.

This type of device is complicated and expensive to fabricate.

Usually large and inconvenient equipment is required.

Relatively long periods of time are required to obtain an output from this type of device if the frequency in question is in the audio or subaudio range. Delays of one to one hundred seconds are common.

The readout from this type of filter or indicator is usually only visual.

It is, therefore, an object of this invention to provide a digital notch filter that compares the period of an input signal with a time period in the filter and gives an indication if the time periods conicide.

Another object of this invention is to provide a digital notch filter that compares the period of an input signal with a time period in the filter and gives an indication that the frequency of the incoming signal is either high or low if the time periods do not coincide.

A further object of this invention is to provide a filter that indicates digitally the frequency deviation of an input signal from the resonant frequency of the filter.

Still another object of this invention is to provide a digital notch filter which eliminates error conditions that exist in prior art digital notch filters.

Other objects and advantages of this invention will become apparent hereinafter and in the drawings in which:

FIGS. 15 and 15a are a logic diagram of the controlled counter 611 in FIG. 14.

Reference is made numerous times throughout this disclosure concerning the triggering, setting, and resetting of different types of multivibrators. The multivibrators used in this invention function such that they respond to a false going pulse only. Also, the small delays produced by the setting, resetting, and triggering of multivibrators and delays produced by gates and amplifiers do not affect the proper operation of the subject invention.

Figure 1:
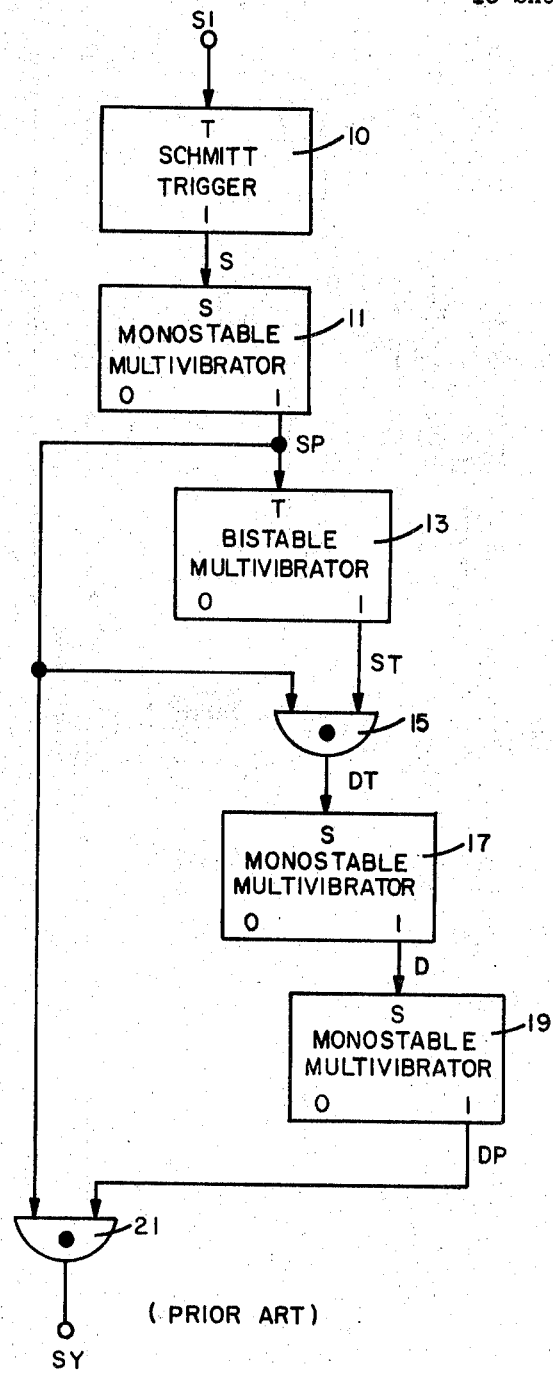
FIG. 1 is a block diagram of a prior art digital gate filter.
Figure 2:
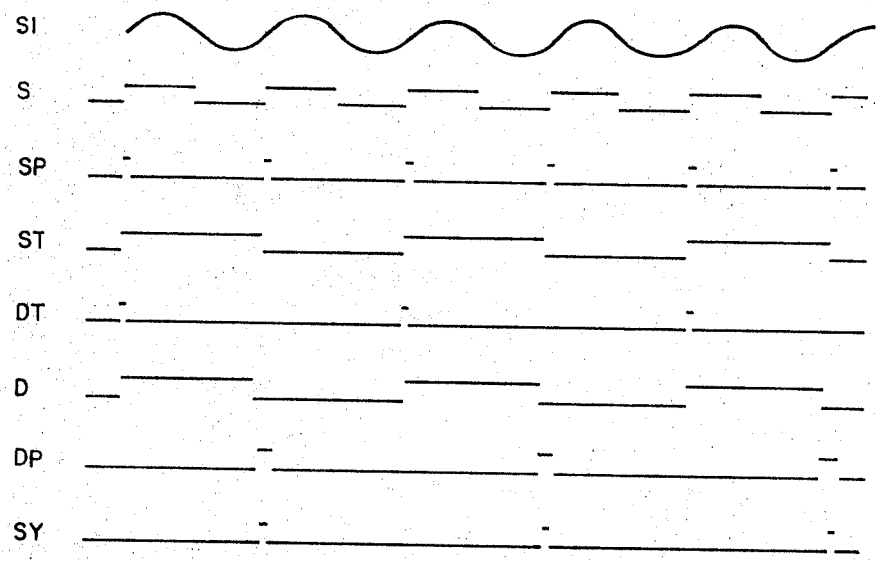
FIGS. 2 through 5 are logic diagrams for the filter in FIG. 1.
Figure 3:
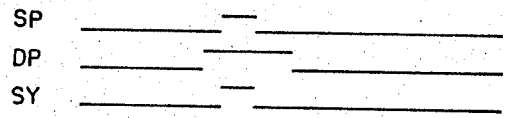
Figure 4:
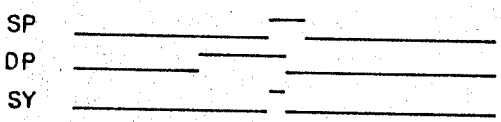
Figure 5:
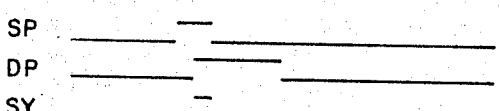
Figure 6:
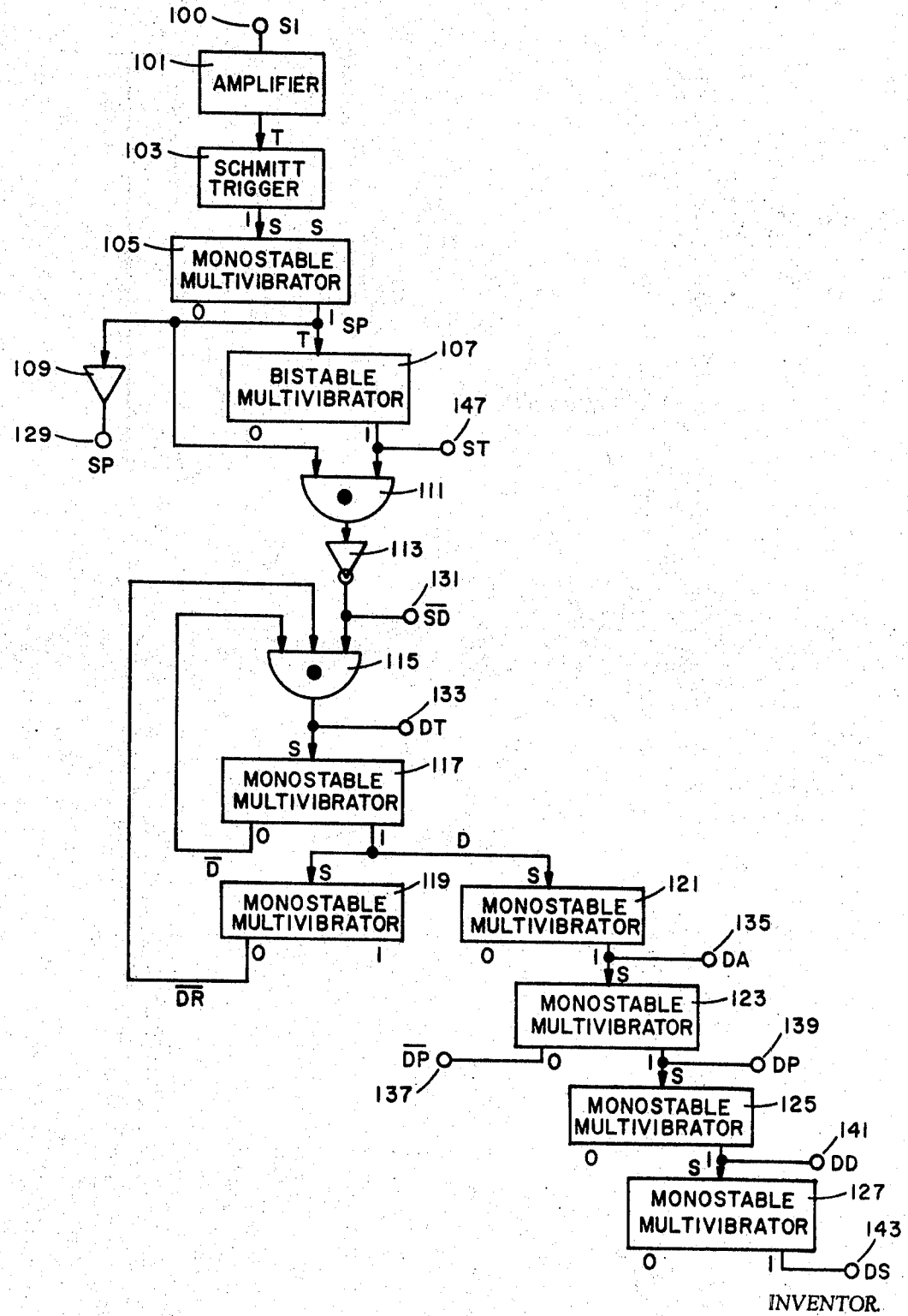
FIG. 6 is a logic diagram of the pulse timing circuits of this invention.

Referring now to FIG. 6 of the drawings in which the timing logic circuitry of this invention is described, high gain amplifier 101 receives a periodic electrical signal or series of pulses SI through input terminal 100 from some source whose output is desired to be monitored or filtered. The output of amplifier 101 is connected to the set input of Schmitt trigger 103 which produces a "1" or true output designated S in this disclosure and which has fast rise and fall times and the same fundamental frequency as SI. The "1" output of Schmitt trigger 103 is connected to the set input of monostable multivibrator 105 the "1" output of which is designated SP in this disclosure and is connected to the set input of triggerable bistable multivibrator 107 and to one input of dual input AND gate 111 whose other input is connected to the "1" output of triggerable bistable multivibrator 107. The "1" output of this multivibrator 107 is designated ST in this disclosure and is connected to terminal 147 for use in subsequent logic. The output of monostable multivibrator 105 is further connected to noninverting pulse amplifier 109 whose output provides pulse SP through terminal 129. This pulse is a driving means for the reliable operation of subsequent logic. The pulse appearing at the output of AND gate 111 is designated SD in this disclosure and is connected to the input terminal of inverting pulse amplifier 113 whose output is a pulse train of one half the frequency of input signal SI and is connected to the first input of three input AND gate 115. The output of pulse amplifier 113 is further connected through terminal 131 to subsequent logic. The output of AND gate 115 is designated DT in this disclosure and is connected to the set input of monstable multivibrator 117 whose "0" or false output is connected to the second input of AND gate 115. The output of AND gate 115 is further connected to terminal 133 for use in subsequent logic. The "1" output of monostable multivibrator 117 is designated D in this disclosure and is connected to the set inputs of monostable multivibrators 119 and 121. The "0" output of monostable multivibrator 119 is designated $\overline{DR}$ in this disclosure and is connected to the third input of AND gate 115. The on or set time of monostable multivibrator 119 is adjusted to be $tDR=0.8 \times tD$, where $tD$ is the set time of monostable multivibrator 117 and $tDR$ is the set time of monostable multivibrator 119. The on time of monostable multivibrator 117 is set to be $tD=$(input frequency period of SI) minus $tDA$ minus $\frac{1}{2}$ $(tDP)$ where $tDA$ is the on time of monostable multivibrator 121 and $tDP$ is the gate tolerance time. The trailing edge of D triggers monostable multivibrator 119 on and thus prevents, by AND gate 115 means, monostable multivibrator 117 from being pulsed again following pulse SD until monostable multivibrator 119 has turned off. The "0" output from monostable multivibrator 117 connected to AND gate 115 prevents it being triggered while in the on state. Thus monostable multivibrator 117 will always be turned off for a period of 0.8 times its "on" time for any frequency of input signal SI. This prevents erratic operation of monostable multivibrator 117. Monostable multivibrator 121 is triggered on by a false going pulse from the "1" output of monostable multivibrator 117 and is the first in a chain of four such pulse forming multivibrators. The "1" output of monostable multivibrator 121 is connected to the set input of monostable multivibrator 123 whose "1" output is connected to the set input of monostable multivibrator 125 whose "1" output is connected to the set input of monostable multivibrator 127. These four multivibrators, 121, 123, 125, and 127 are each triggered in turn by a false going pulse from the preceeding one and their pulses follow in time as DA, DP, DD, and DS respectively as designated in this disclosure. The functions of these timing pulses will become clear as they are further discussed in this disclosure. The "1" outputs of multivibrators 121, 123, 125, and 127 are connected to terminals 135, 139, 141, and 143 respectively and the "0" output of multivibrator 123 is connected to terminal 137 all of which are used in subsequent logic to be described as this disclosure proceeds. The relative pulse width of the various pulses discussed in this disclosure are compared in Table 1 of this disclosure. Reference to this table will make clear the lower limits placed on the pulse widths by the instant invention for reliable operation:

TABLE 1

| Pulse: | Relative minimum width |
|---|---|
| SP | [1] 1.0 |
| DA | 2.5 |
| DP | 1.1 |
| DD | 1.0 |
| DS | 1.2 |

[1] The time duration of SP should be made as short as logic operation will permit.

NOTE: The minimum duration of pulse DP may be more or less than indicated depending on the rise and fall times of the logic used.

Figure 7:
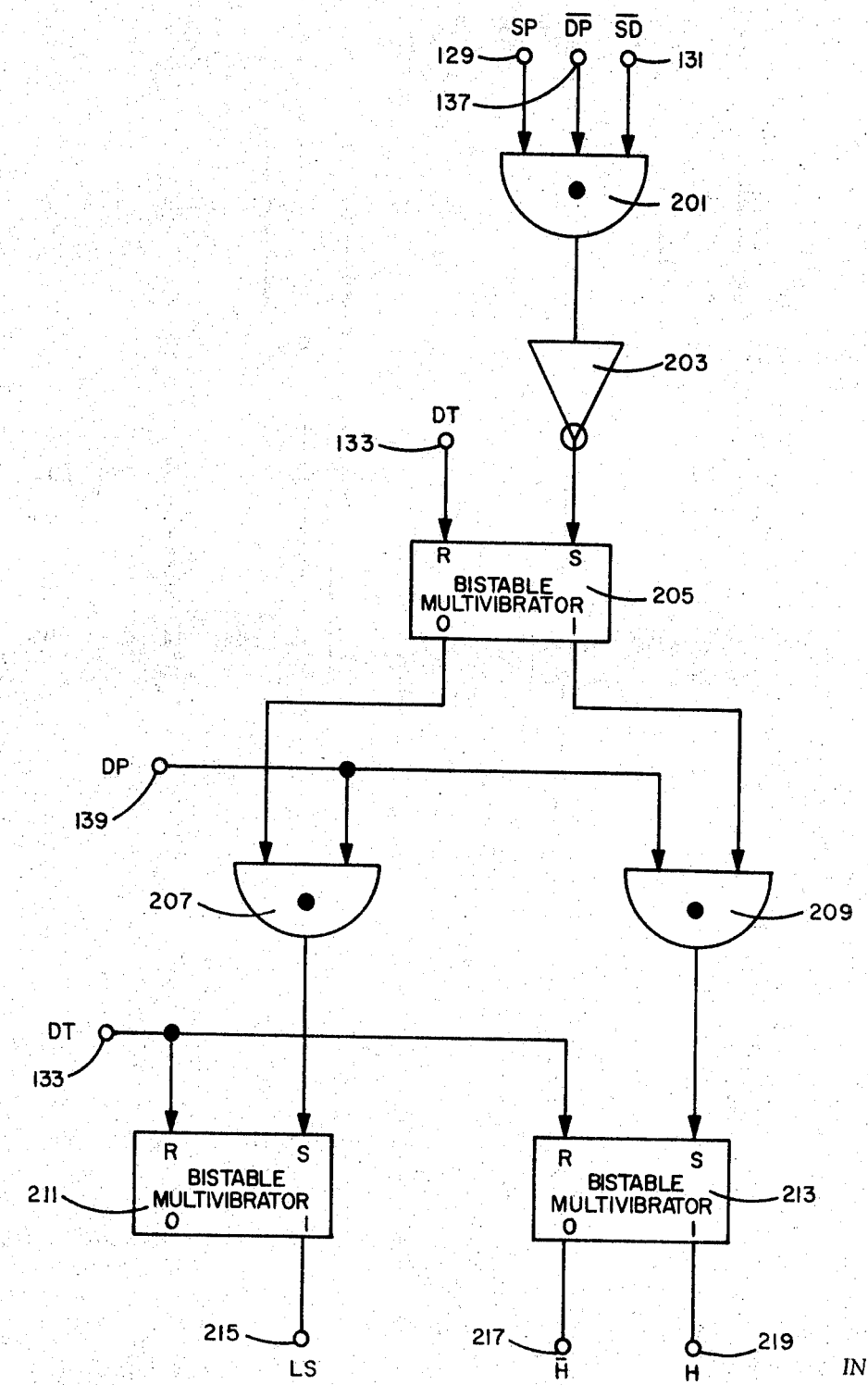
FIG. 7 is a logic diagram of the pulse encoder of this invention.

Referring now to FIG. 7 of the drawings in which the logic diagram of the pulse encoder logic of this invention is illustrated, logic pulse SP, $\overline{DP}$, and $\overline{SD}$ are connected through terminals 129, 137, and 131 respectively to the inputs of the three input AND gate 201. (Reference FIG. 6 of this disclosure for generation of these pulses). The output of AND gate 201 is connected to the input of inverting pulse amplifier 203 whose output is used to set bistable multivibrator 205 through its set input on the leading edge of the coincidence pulse produced by SP, $\overline{DP}$, and $\overline{SD}$. Logic pulse DT (whose generation is described in FIG. 6 of this disclosure) is connected through terminal 133 to the reset input of bistable multivibrator 205 and further connected to the reset inputs of bistable multivibrators 211 and 213. This pulse resets these logic elements at the beginning of each timing pulse D. The function of bistable multivibrator 205 is such that its state at pulse time DP or gate time indicates if an SP pulse occurred before the DP gate pulse. If an SP pulse did occur before gate pulse DP, this indicates that the frequency of input signal SI is higher than that to which the filter is tuned. To encode this information at the roper time in bistable storage multivibrators 211 and 213, the "0" output of bistable multivibrator 205 is connected to one input of dual input AND gate 207 and the "1" output of bistable multivibrator 205 is connected to one input of dual input AND gate 209. The second input of both of these AND gates are connected together to gate pulse DP through terminal 139 which is illustrated on FIG. 6 of this disclosure. The output of AND gate 207 is connected to the set input of bistable multivibrator 211 and the output of AND gate 209 is connected to the set input of bistable multivibrator 213. This arrangement causes bistable multivibrator 211 to be set between DP pulse time and the following DT pulse time if an SP pulse occurs during or after the gate pulse DP and causes bistable multivibrator 213 to be set between DP pulse time and the following DT pulse time if an SP pulse occurs before DP gate pulse time. The "1" output of bistable multivibrator 211 is connected to terminal 215 and the "0" and "1" outputs of bistable multivibrator 213 are connected to terminals 217 and 219 respectively for use in subsequent logic.

Figure 8:
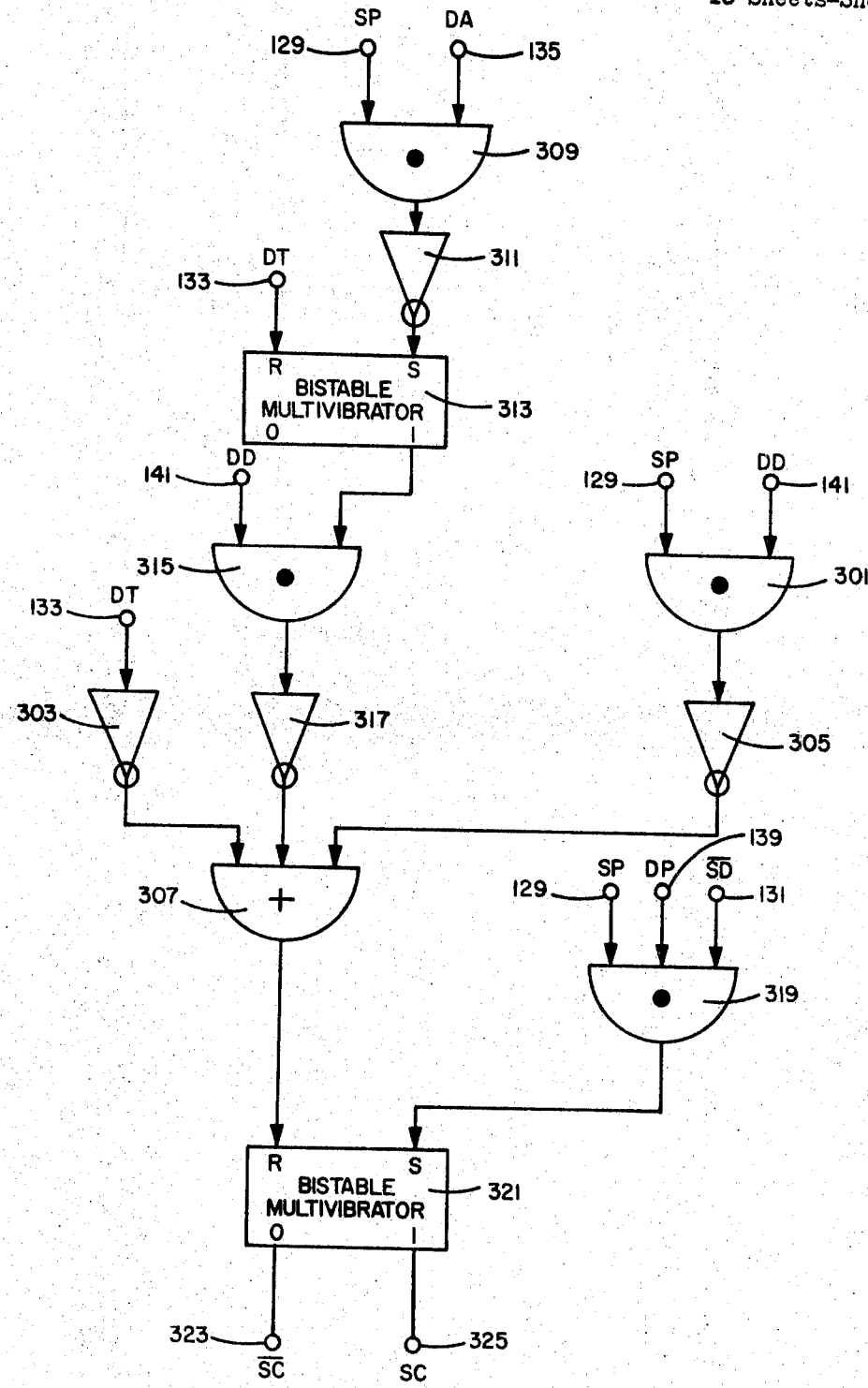
FIG. 8 is a logic diagram of the pulse overlap and resonance detector of this invention.

Referring now to FIG. 8 of the drawings in which the logic diagram of the pulse overlap and resonance detectors of this invention are illustrated, dual input AND gate 301 has one input connected to signal pulse SP through terminal 129 and the other input connected to delay detector pulse DD through terminal 141, both pulses being generated by logic illustrated in FIG. 6 of this disclosure. The output of AND gate 301 is connected to inverting pulse amplifier 305 and has a true output if an SP pulse occurs during the DD pulse period. Pulse DD immediately follows gate pulse DP and when compared with an SP pulse as in AND gate 301 will indicate when an SP pulse is true during both a DP and a DD pulse—this condition exists when the frequency of SI is slightly low such that the false going or trailing edge of gate pulse DP occurs when signal pulse SP is true. The condition where the frequency of SI is slightly high is detected by the following circuit: Pulses SP and DA are connected to the inputs of dual AND gate 309 through terminals 129 and 135 respectively. The output of AND gate 309 is connected to the input of inverting pulse amplifier 311 and has a true output if an SP pulse occurs during the DA pulse period. Advance detector pulse DA immediately preceeds gate pulse DP and when compared with an SP pulse as in AND gate 309 will indicate when an SP pulse occures during both a DA and a DP pulse—this condition exists when the frequency of SI is slightly high such that a true going or leading edge of gate pulse DP occurs when signal pulse SP is true. The output of inverting pulse amplifier 311 is connected to the set input of bistable multivibrator 313 which will be set on the leading edge of any coincidence of SP and DA pulses. Pulse DT is connected to the reset input of bistable multivibrator 313 through terminal 133 to perform the reset with every leading edge of timing ulse D. The "1" output of bistable multivibrator 313 is connected to one input of dual input AND gate 315 whose other input is connected to pulse DD through terminal 141. The output of AND gate 315 is connected to the input of inverting pulse amplifier 317 and is true at the time of pulse DD if the leading edge of signal pulse SP occurred during the time that DA was true. Three input OR gate 307 receives its first input from inverting pulse amplifier 303 whose input comes from pulse DT through terminal 133. The second input of OR gate 307 is connected to the output of pulse amplifier 305 and the third input is connected to the output of pulse amplifier 317. The output of OR gate 307 is connected to the reset input of bistable multivibrator 321 and resets this multivibrator at the leading edge of each timing pulse DT or at the leading edge of pulse DD if either the leading or the trailing edge of signal pulse SP has occurred while pulses DA or DD respectively were true. The output of AND gate 319 is connected to the set input of bistable multivibrator 321, its three inputs being connected to pulses SP, $\overline{DP}$, and $\overline{SD}$ through terminals 129, 139, and 131 respectively. This AND gate detects when signal pulse SP occurs at the same time as gate pulse DP. Thus bistable multivibrator 321 is set between the trailing edge of SP and the following trailing edge of timing pulse DR only if signal pulse SP occurs completely within the time limits of gate pulse DP. This establishes the bandwidth definition of the instant invention. The "0" and "1" outputs of bistable multivibrator 321 are connected through terminals 323 and 325 respectively to the logic elements of the pulse decoder section of this invention.

Figure 9:
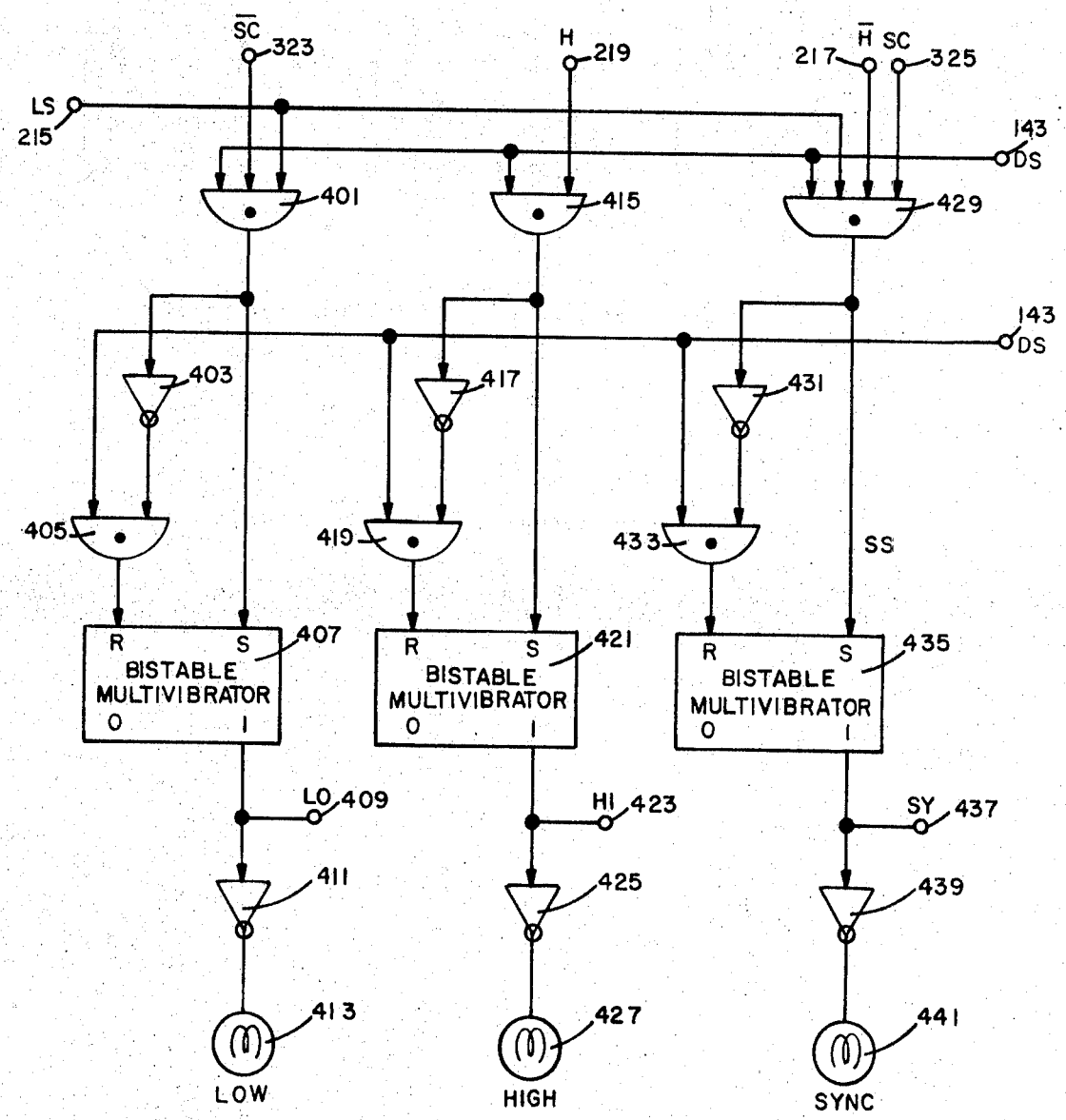
FIG. 9 is a logic diagram of the pulse decoder and output multivibrators of this invention.

Referring now to FIG. 9 of the drawings in which the logic diagram of the pulse decoder and output multivibrators of the subject invention are illustrated, the first input of three input AND gate 401 is connected to sampling pulse DS through terminal 143 which are part of FIG. 6 of this discloseur. The second input of AND gate 401 is connected to the "0" output of bistable multivibrator 321 through terminal 323 and the third input of AND gate 401 is connected to the "1" output of bistable multivibrator 211 through terminal 215. The output of AND gate 401 is true during the true time of sampling pulse DS only if the frequency of SI is low as compared to the period of the filter or if signal pulse SP goes false after gate pulse DP goes false. The output of AND gate 401 is connected to the input of inverting pulse amplifier 403 and to the set input of bistable multivibrator 407. The output of inverting pulse amplifier 403 is connected to one input of dual input AND gate 405; the other input of which is connected to sampling pulse DS through terminal 143. The output of AND gate 405 is connected to the reset input of bistable multivibrator 407. These connections cause this multivibrator to be set if the output of AND gate 401 is true during sampling pulse DS and cause it to be reset if the output of AND gate 401 is false during sampling pulse DS. The "1" output of bistable multivibrator 407 is true only if the frequency of SI is low as compared to the time constants of the filter described in this disclosure. The "1" output of bistable multivibrator 407 is connected to terminal 409 for external indication of low input frequency of SI and is also connected to the input of inverting lamp driver amplifier 411 whose output is connected to and drives indicator lamp 413 which gives a visual indication of low frequency conditions of input signal SI. This completes the description of the "LOW" output indication.

One input of dual input AND gate 415 is connected to sampling pulse DS through terminal 143 and the other input is connected to the "1" output of bistable multivibrator 213 through terminal 219. The output of AND gate 415 is connected to the set input of bistable multivibrator 421 and further connected to the input of inverting pulse amplifier 417 whose output is connected to one input of dual input AND gate 419 the other input of which is connected to sampling pulse DS through terminal 143. The output of AND gate 419 is connected to the reset input of bistable multivibrator 421 whose operation and that of its reset AND gate 419 is identical to the operation already described for AND gate 405 and bistable multivibrator 407. The "1" output of bistable multivibrator 421 is connected to terminal 423 for external indication of high input frequency of SI and is also connected to the input of inverting lamp driver amplifier 425 whose output is connected to and drives indicator lamp 427 which is a visual indication of high frequency condition of input signal SI. This completes the description of the "HIGH" output indication.

Input one to four input AND gate 429 is connected to sampling pulse DS through terminal 143, input two is connected to the "1" output of bistable multivibrator 211 through terminal 215, input three is connected to the "0" output of bistable multivibrator 213 through terminal 217, and the fourth input is connected to the "1" output of bistable multivibrator 321 through terminal 325. The output of AND gate 429 is true during DS time only if signal pulse SP has been true during gate pulse DP and at no other time. This pulse is designated SS in this disclosure and is connected to the set input of bistable multivibrator 435 and further connected to the input of inverting pulse amplifier 431 whose output is connected to dual input AND gate 433 the other input of which is connected to sampling pulse DS through terminal 143. The output of AND gate 433 is connected to the reset input of bistable multivibrator 435 whose operation and that of its reset AND gate 433 are identical to the operation already described for AND gate 405 and bistable multivibrator 407. The "1" output of bistable multivibrator 435 is connected to terminal 437 for external indication of an input frequency which is in synchronization with the filter within the tolerance of the gate pulse DP minus the time of signal pulse SP and is also connected to the input of inverting lamp driver amplifier 439 whose output is connected to and drives indicator lamp 441 which is a visual indication of synchronization or resonance conditions. The resonance indication appearing at terminal 437 may be used for gating the original input signal SI to some desired location. This will allow the subject invention to function as a true digital notch filter with almost infinite rejection outside its passband and no attenuation in its passband. This is one of the functions of an ideal bandpass filter.

Figure 10:
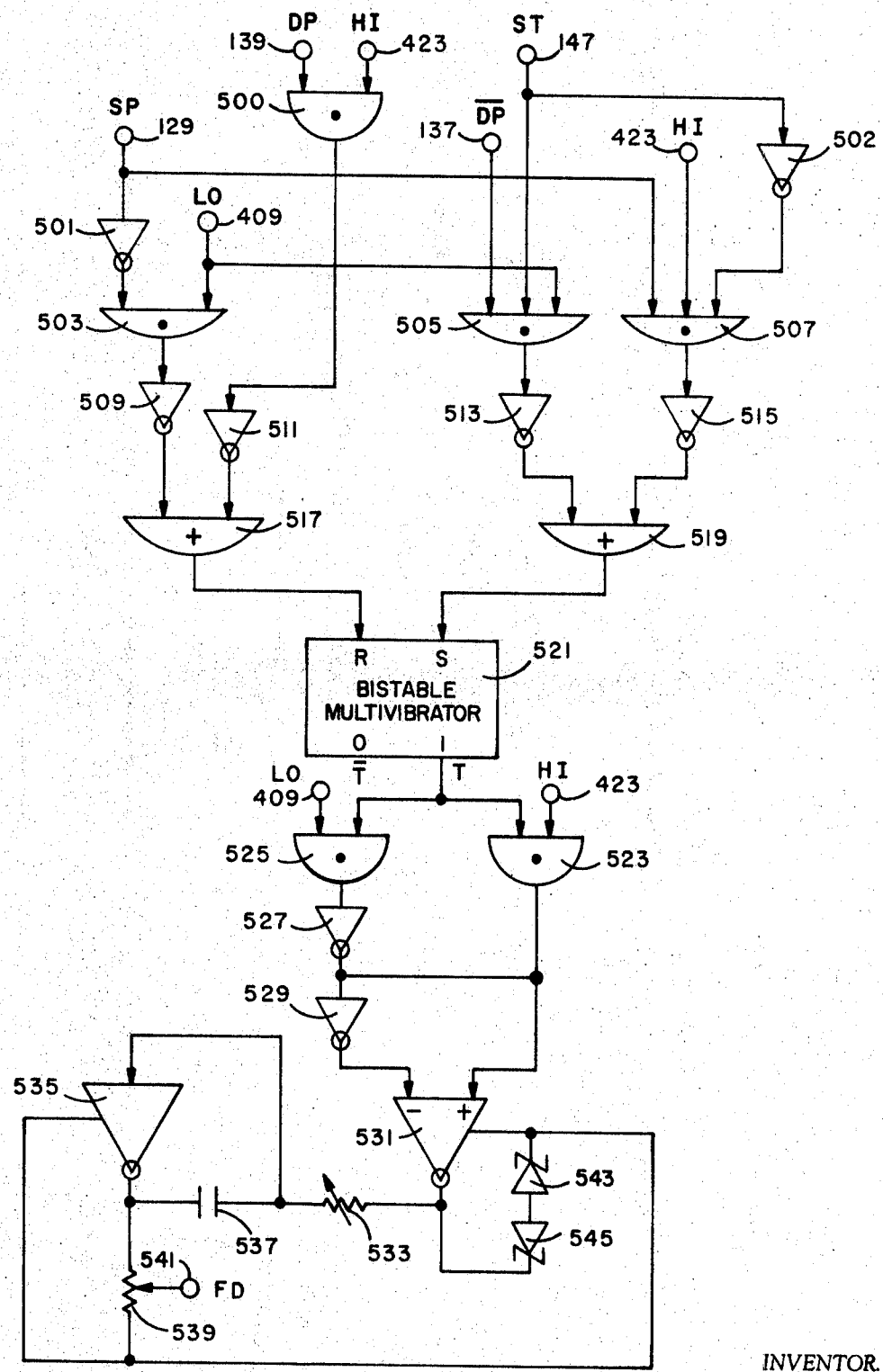
FIG. 10 is a diagram of the circuitry and logic of the frequency deviation indicator of this invention.
Figure 11:
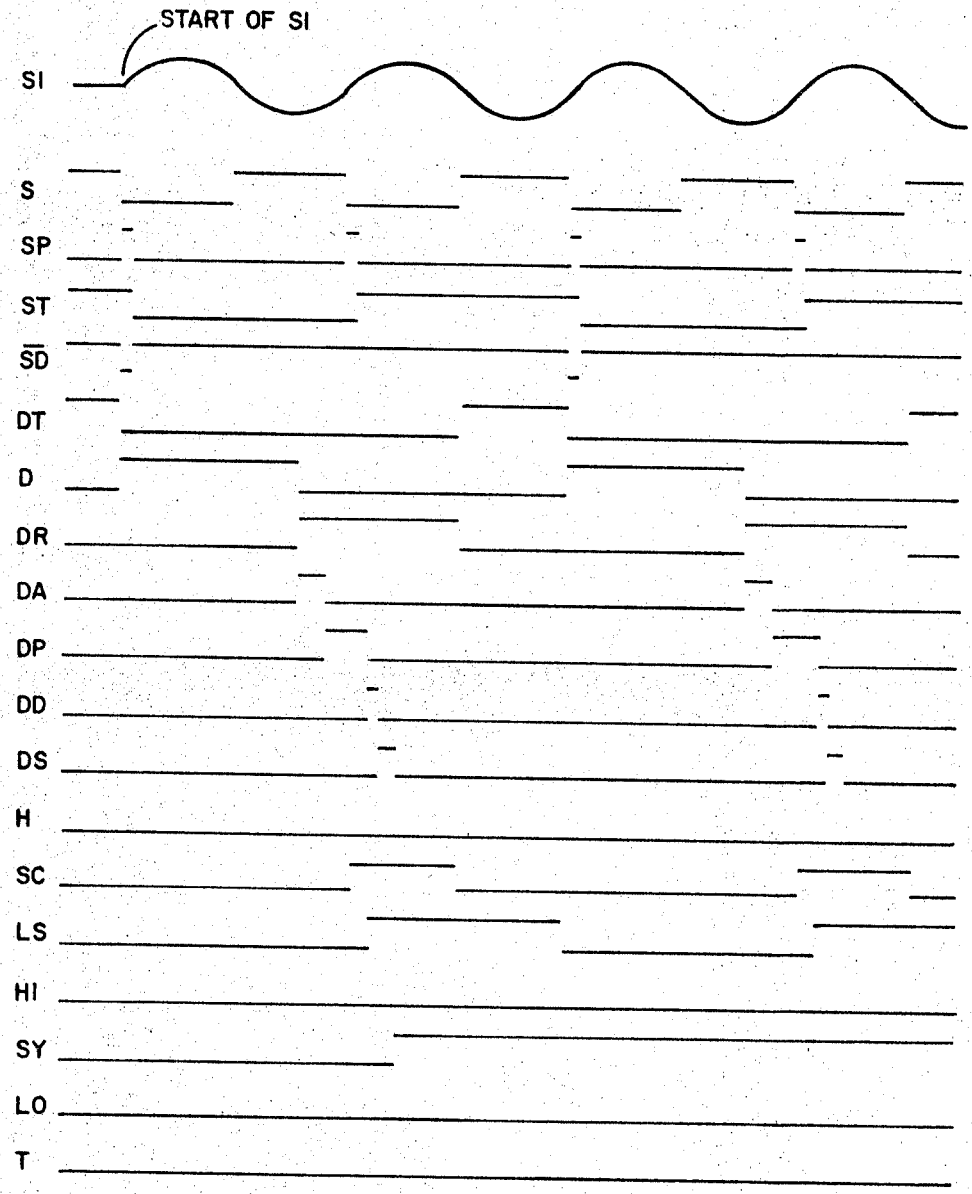
FIG. 11 is a pulse diagram illustrating the timing relationships in this invention at coincidence or resonance.
Figure 12:
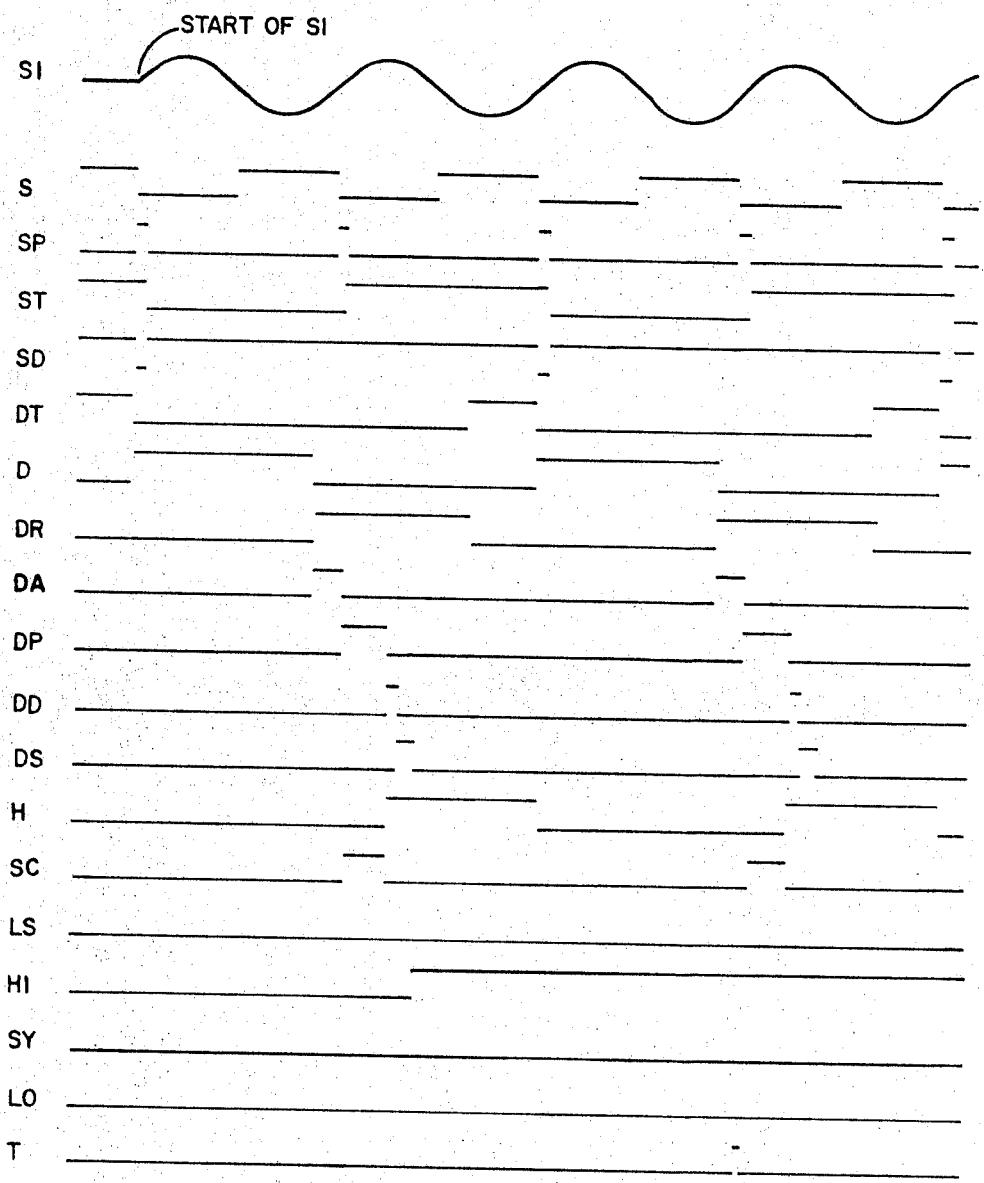
FIG. 12 is a pulse diagram illustrating the timing relationships in this invention at a frequency higher than resonance.
Figure 13:
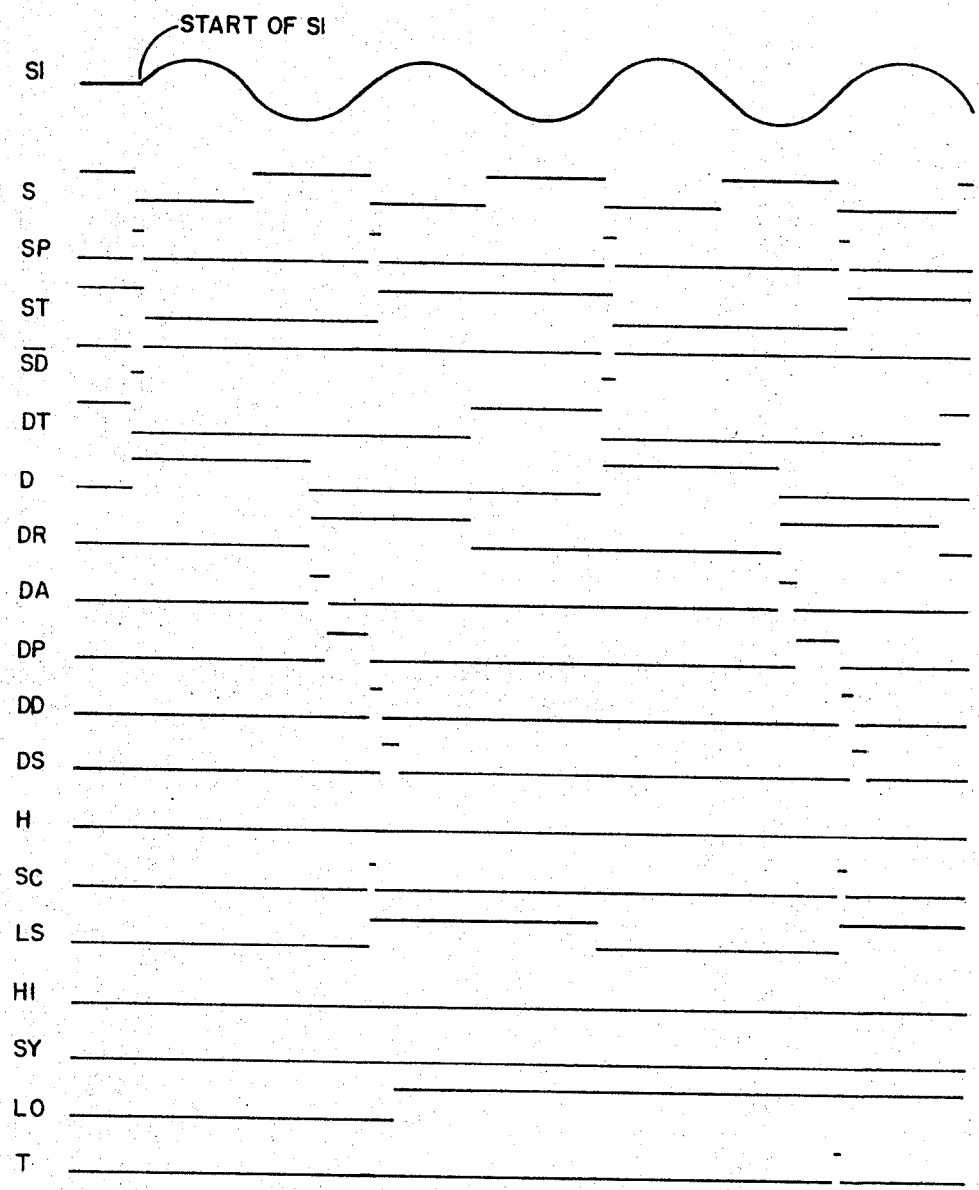
FIG. 13 is a pulse diagram illustrating the timing relationships in this invention at a frequency lower than resonance.

Referring now to FIG. 10 of the drawings in which the circuitry and logic of the frequency deviation indicator of the instant invention are described, one input of dual input AND gate 503 is connected to low frequency indication LO through terminal 409 and the other input is connected to the output of inverting pulse amplifier 501 whose input is connected to signal pulse SP through terminal 129. The output of AND gate 503 is connected to the input of inverting pulse amplifier 509 whose output is connected to one input of dual input OR gate 517. The other input of OR gate 517 is connected to the output of inverting pulse amplifier 511 whose input is connected to the output of AND gate 500. The two inputs of AND gate 500 are connected to high frequency indication HI and pulse DP through terminals 423 and 139 respectively. The output of OR gate 517 is connected to the reset input of bistable multivibrator 521. The set input of multivibrator 521 is connected to a group of gates as follows: One input of three input AND gate 505 is connected to indication LO through terminal 409, the second input is connected to $\overline{DP}$ through terminal 137, and the third input is connected to ST through terminal 147. The output of AND gate 505 is connected to inverting pulse amplifier 513 whose output is connected to one input of dual input OR gate 519. The other input of OR gate 519 is connected to the output of inverting pulse amplifier 515 which receives its input from AND gate 507. This AND gate has three inputs, the first of which is connected to the output of inverting pulse amplifier 502 whose input is connected to ST through terminal 147. The second input of AND gate 507 is connected to HI through terminal 423 and the third input is connected to signal pulse SP through terminal 129. Inverting pulse amplifiers 509, 511, 513, and 515 are all AC coupled amplifiers. The set and reset gating connected to bistable multivibrator 521 cause its "1" output to be a pulse which is true for a time which is identical to the time displacement of signal pulse SP from gate pulse DP. This pulse appears before or after gate pulse DP if the frequency of input signal SI is high or low respectively. The time duration of this pulse is proportional to the frequency deviation of input signal SI from the resonant frequency of the subject invention. This pulse exists only when HI or LO output indications are true and may be converted to an analog voltage output or to a digital readout of frequency deviation in the following way: The "1" output of bistable multivibrator 521 is designated T in this disclosure and is connected to one input of each of two dual input AND gates 523 and 525. The second input of AND gate 523 is connected to HI through terminal 423 and the second input of AND gate 525 is connected to LO through terminal 409. The output of AND gate 525 is connected to the input of inverting pulse amplifier 527 whose output is connected to the input of inverting pulse amplifier 529. The input of pulse amplifier 529 is further connected to the output of AND gate 523 and the "+" input of differential input operational amplifier 531. The output of amplifier 529 is connected to the "—" input of differential operational amplifier 531. (The differential inputs are described for a positive voltage pulse out of AND gate 523 and amplifier 529, if the logic used produces negative pulses out of 523 and 529, then the differential inputs to amplifier 531 must be reversed.) The output of operational amplifier 531 is connected to the input of operational amplifier 535 through adjustable input resistor 533 and the output of amplifier 531 is further connected to "back-to-back" precision Zener reference diodes 543 and 545, the remaining terminal of diode 543 being connected to the output return of amplifier 531. The output of operational amplifier 535 is connected to one side of potentiometer 539 and to one terminal of capacitor 537 whose other terminal is connected to the input of amplifier 535. The opposite end of potentiometer 539 is connected to the output return of amplifiers 531 and 535, and the slider or adjustable top of potentiometer 539 is connected to terminal 541 and supplies an analog frequency deviation signal designated FD in this disclosure. The above described circuits provide analog signal FD which is a positive voltage if the frequency is high and is a negative signal if the frequency is low, the magnitude of the voltage is proportional to the magnitude of the frequency deviation. This response of signal FD to frequency deviation is accomplished by the switched differential drive to operational amplifier 531, the bilateral voltage reference of diodes 543 and 545, and to the feedback integrating characteristics of operational amplifier 535. This analog signal may be used to operate an analog recorder or indicator or converted to digital form to operate a digital recorder or indicator.

Several variations and combinations of the functional blocks of the subject invention are possible. Refering now to FIG. 14 in which the logic circuitry of an alternate embodiment of the timing pulse generator is illustrated, logic elements 100 through 115 are the same as illustrated in FIG. 6 of this disclosure and have the same operation as described in connection with FIG. 6. The logic illustrated in FIG. 14 differs from that illustrated in FIG. 6 in that timing pulses D and DP are made much more stable and precise by the use of precision oscillator 601 and controlled counter 611 in connection with gating logic.

The output of three input AND gate 115 is connected to terminal 133 for use in subsequent logic and is also connected to the set input of bistable multivibrator 118 which is comparable to monostable multivibrator 117 of FIG. 6 of this disclosure in that multivibrator 118 generates timing pulse D. The inputs of AND gate 115 are connected as described in FIG. 6 with the exception of one which is connected to the "0" output of bistable multivibrator 118. The "1" output of multivibrator 118 is designated D in this disclosure and is connected to terminal 120 for use in subsequent logic, and is further connected to the set inputs of monostable multivibrators 119 and 121. These multivibrators are identical to those of FIG. 6 of the same number and are used to generate timing pulses DR and DA. The "1" output of multivibrator 121 is designated DA and is connected to terminal 135 for use in subsequent logic. The "0" output of 121 is designated $\overline{DA}$ and is connected to terminal 134 for use in subsequent logic. The reset input of bistable multivibrator 118 is connected to the output of dual input OR gate 615 whose inputs will be described. AND gates 603 and 607 have AC coupled outputs. Precision oscillator 601 has its output connected to dual input AND gates 603 and 607. The other input of AND gate 603 is connected to timing pulse D through terminal 120 and allows pulses from oscillator 601 to pass through the output of AND gate 603 to the input of dual input OR gate 609 when timing pulse D is true. The other input of OR gate 609 is connected to the output of dual input AND gate 607 which has its other input connected to pulse DP through terminal 139 and passes pulses from oscillator 601 when timing pulse DP is true.

Figure 15:
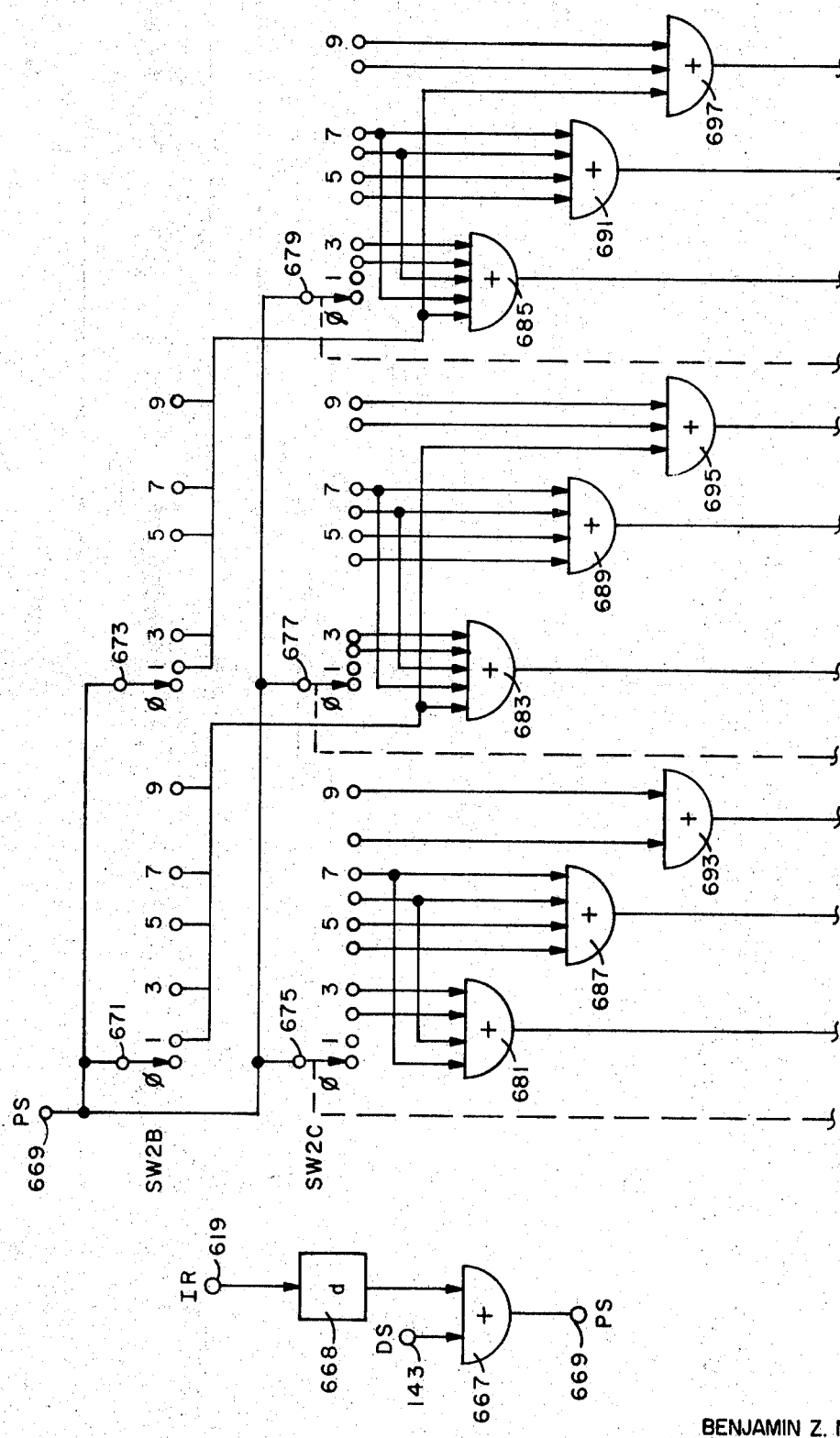

The output of OR gate 609 is connected to the trigger or count input of controlled counter 611 whose logic circuitry is illustrated in FIG. 15 of this disclosure. Controlled counter 611 produces output SY1 and SY2. Output SY1 goes to a false state when the time or count setting for timing pulse D is reached and output SY2 goes false when the time or count setting for timing pulse DP is reached. The SY1 output or counter 611 is connected through terminal 659 to one input of dual input OR gate 615 the other input of which is connected to initial reset pulse IR through terminal 619. This initial reset pulse goes to a false state momentarily when power is applied to the logic of the filter in order to initially reset multivibrators 118 and 124. This is necessary in order to start the filter properly. The output of OR gate 615 is connected to the reset input of bistable multivibrator 118 and resets this multivibrator at initial power application and at the end of timing pulse period D. When multivibrator 118 is reset it causes a false level to be applied to AND gate 603 which stops the pulses from oscillator 601 and thus the advancing of the controlled counter 611. At the same time, monostable multivibrator 121 produces timing pulse DA and $\overline{DA}$ which causes controlled counter 611 to be reset on the leading edge of DA through terminal 134 and OR gate 613 and causes bistable multivibrator 124 to become set through terminal 135.

The "1" output of monostable multivibrator 124 is connected to one input of AND gate 607 and also to the the set input of monostable multivibrator 125. The "0" output of monostable multivibrator 124 is designated $\overline{DP}$ and is connected to terminal 137. When multivibrator 124 is set, DP is true and causes pulses from oscillator 601 to pass through AND gate 607 and OR gate 609 to the count input of controlled counter 611. When the contents of this counter reach the setting for the time duration of DP, the ouptut SY2 goes also and resets bistable multivibrator 124 through terminal 661 and OR gate 617. The "1" output of multivibrator 124 goes to the false state and turns off pulses from counter 611 through gate 607 and sets monostable multivibrator 125 through its set input. The "1" output of monostable multivibrator 125 is designated DD in this disclosure and is connected to the set input of monostable multivibrator 127 and to terminal 141 for use in subsequent logic. The "1" output of monostable multivibrator 127 is designated DS in this disclosure and is connected to terminal 143 for use in subsequent logic. The reset terminal of controlled counter 611 is 621 and is conneected to the output of three input OR gate 613. One input of this OR gate is conneected to the "0" output of multivibrator 125, one input is connected to initial reset pulse IR through terminal 619, and the remaining input is connected to pulse DA through terminal 134. This causes controlled counter 611 to be reset at initial power application, on the leading edge of pulse DA, and on the leading edge of pulse DD.

Figure 14:
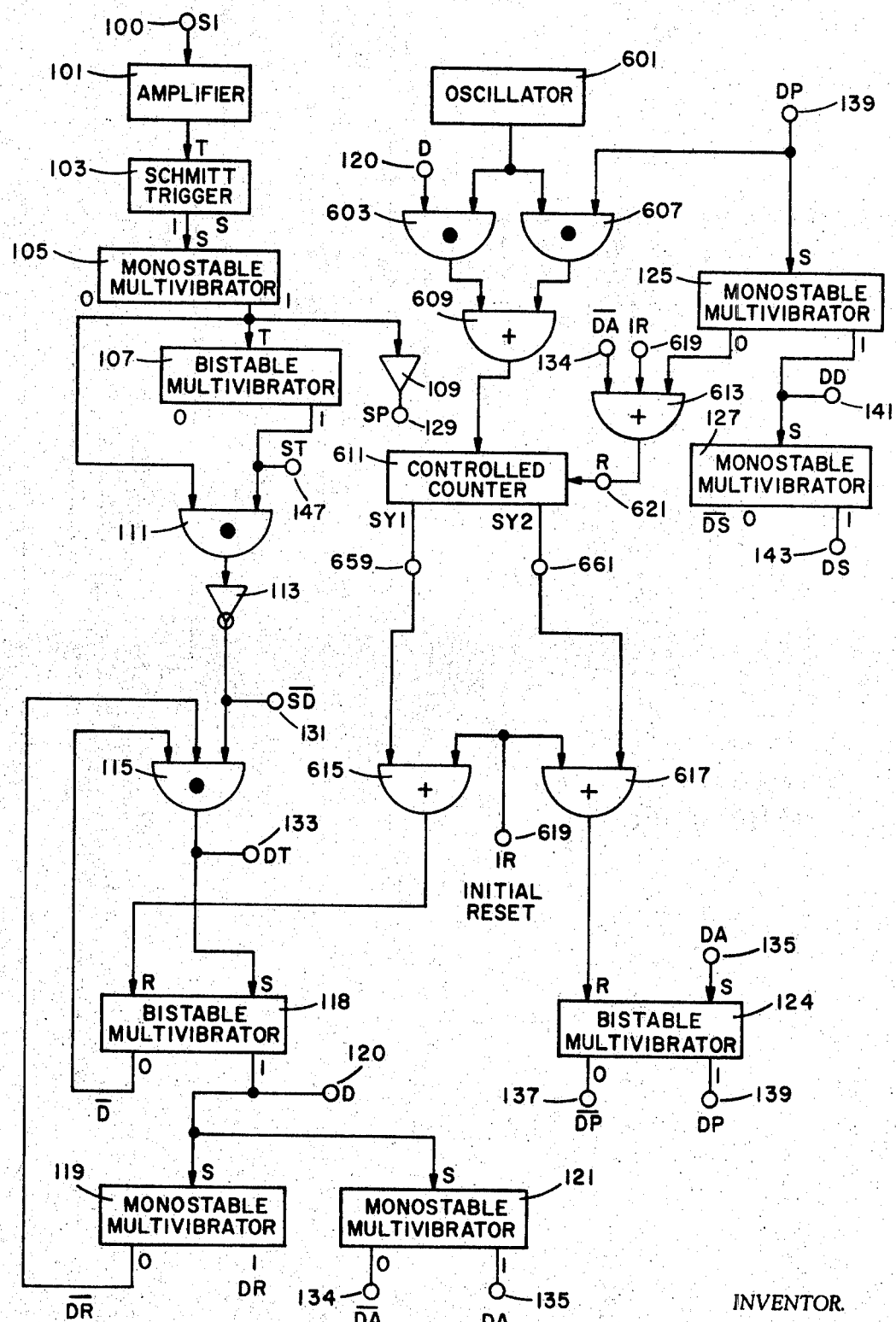
FIG. 14 is a logic diagram of the circuitry of an alternate method of generating timing pulses in the instant invention.

The operation of the logic illustrated in FIG. 14 of this disclosure is very similar to that of the logic illustrated in FIG. 6 in that the timing pulses produced by the logic illustrated in FIG. 14 are more precise but otherwise identical to those produced by the logic illustrated in FIG. 6 as far as sequence and voltage are concerned.

Referring now to FIG. 15 in which the logic circuitry of the controlled counter is illustrated, pulses from the above described oscillator enter the counter through terminal 663 and operates BCD counter 623 directly and BCD counters 625 through 629 by carry means from one counter to the next. The output of each counter is composed of four outputs and four inverted outputs which are connected to BCD-to-decimal converters 631 through 637 for counters 623 through 629 respectively. The 0 through 9 outputs of each of these converters is connected to the terminals of switches 639 through 645. This allows these switches to be set to a desired count for the time duration of D. The outputs of converters 631 through 637 are also connected to the terminals of switches 647 through 651 respectively. These switches can be set to a desired count for the time duration of DP. Outputs SY1 and SY2 are accomplished in the following way: The wipers of switches 639 through 645 are connected to the inputs of inverting NAND gate 655 whose output is connected to terminal 659. The signal on this terminal is designated SY1 and is true at every state of the BCD counters except the one set in switches 639 through 645 which produces a false output. The wipers of switches 647 through 651 are connected to the input of inverting NAND gate 657 whose ontput is connected to terminal 661. The output at terminal 661 is designated SY2 and is true at every state of the BCD counters except the one set in switches 647 through 651 which produces a false output. The controlled counter may be extended to produce longer timing periods of timing pulses D and DP, and the count setting for pulse DP will necessarily always be less than it will be for pulse D.

The operation of this invention is based upon the fact that a series of timing pulses may be generated by a known and recurrent point on an electrical vibration of one fundamental frequency in such a way that these accurate timing pulses are of known and stable duration and may be further compared to the original signal in such a way as to reveal the exact frequency of the signal within specified limits and to reveal the other time relationships between the timing pulses and the signal.

The resonant frequency of this invention is equal to $t$D plus $t$DA plus ½$t$DP, where $t$D is the on time of bistable multivibrator 118 of FIG. 14, $t$DA is the on time of monostable multivibrator 121 and $t$DP is the on time of the gate pulse multivibrator 124. It is clearly seen that if the gate tolerance time $t$DP is varied by a change in the settings of switches 647 through 651 of FIG. 15 of this disclosure, this will cause a proportional shift of the resonant frequency of the filter. This undesirable situation may be corrected by presetting BCD counters 623 through 629 to a value of ½$t$DP just before the start of timing period $t$D which will cause pulse SY1 to be early by a time equal to ½$t$DP. Thus the resonant frequency of the filter may be made to be constant with a changing setting of gate pulse time $t$DP. The BCD counters are preset at initial power on time delayed and at strobe pulse time, DS, before the start of period $t$D in the following way: Switches 671 through 675 are mechanically connected to and synchronized with switch 651 in such a way that when switch 651 is turned to a specific location, switches 671 and 675 turn to the corresponding location. Switches 673 and 677 work similarly with switch 649 and switch 679 works similarly with switch 647. The wipers of switches 671 through 679 are all electrically connected together and are further connected to the output of OR gate 667 through terminal 669 which carries a pulse designated PS in this disclosure. The first input to dual input OR gate 667 is connected to pulse DS through terminal 143 and the other input is connected to pulse IR delayed by "one shot" delay element 668 through terminal 619. The output of OR gate 667 and thus the outputs of certain OR gates to be discussed will be true only at initial power on time delayed by an amount $d$ and at strobe pulse time, DS. The odd numbered positions of switch 671 are connected together and form the first input to OR gate 683 and 695. The odd numbered positions of switch 673 are also connected together and form the first input to OR gates 685 and 697. These OR gates are used to preset bit weights 1 and 4 in BCD counters 625 and 623 respectively. These gate outputs represent the preset to the next lower decade for the division of an odd single digit integer by 2 or the resulting quotient of 0.5—they preset the next lower decade to a count of 5. The presets for BCD counter 627 come from switch 675 and are as follows: Switch position 2 is connected to an input of OR gate 681 which presets the bit weight 1 of counter 627 to the "1" state, the other input to OR gate 681 are connected to switch positions 3, 6, and 7. Switch position 4 is connected to one input of OR gate 687 which presets bit weight 2 of counter 627 to the "1" state, the other inputs to OR gate 687 are connected to switch positions 5, 6, and 7 of switch 675. Switch positions 8 and 9 of this switch are connected to the inputs of OR gate 693 and are used to preset bit weight 4 of counter 627 to the "1" state. Switches 677 and 679 are similarly connected through OR gates 683, 689, 695 and 685, 691, 697 to preset inputs of bit weights 1, 2, and 4 of BCD counters 625 and 623, respectively, as indicated in FIG. 15 of this disclosure. The exception is that OR gates 683, 695 and 685, 697 have an additional input each to preset BCD counters 625 and 623, respectively, to a count of 5 as described above. Thus the object of presetting the BCD decode counters is to adjust the time duration of pulse D to compensate for a change in resonant frequency brought about by a change in the duration of pulse DP. The presetting scheme as described in FIG. 15 of this disclosure does not allow any ½ bit weight compensation (as described above in connection with switches 671 and 673) for odd switch settings of the least significant decode counter 623. If this compensation is desired in a particular version of the subject invention, switches 647 and 679, OR gates 685, 691, and 697, may be eliminated and the connection to odd positions of switch 673 made directly to the preset of bit weights 1 and 4 of counter 623. In this frequency correction method, it is assumed that pulse time $tDA$ is small compared to pulse time $tDP$.

The advantages offered by this invention are numerous:

When it is tuned to one frequency, no other frequency will produce a resonance indication. Its bandwidth is adjustable over a very wide range. Its bandwidth is $tDP-tSP$, where $tDP$ is the time duration of gate timing pulse DP and $tSP$ is the time duration of signal pulse SP. The bandwidth can, therefore, be made extremely small by adjusting the time durations of pulses DP and SP. It has a very large "Q" at audio and subaudio frequencies. It is not effected by radio frequency interference at the input to the filter. It provides resonance indications, both visual and pulse which may be used for recording, or to gate the original input signal or to reconstruct a sine wave, square wave, pulse, or triangular wave of the same fundamental frequency as the input signal. It provides high frequency (above resonance) indications, both visual and pulse output. It provides low frequency (below resonance) indications, both visual and pulse output. It gives sharp and abrupt transitions between low, resonance, and high frequency indications with no pulse overlap. It indicates the deviation from resonance of the input frequency in the form of a visual signed digital readout or electrical digital readout. It is self starting. It indicates the last state of the input signal even though the input signal vanishes. It follows the freqeuncy variations of the input signal with great accuracy. Only two cycles (the minimum for frequency determination) is required for it to give a reliable readout. This gives very fast response. It is simple to adjust and requires no special techniques or parts to build. It requires no external frequency standard. It is very stable. And it may be constructed in such a way that it is insensitive to relatively large variations of supply voltage.

Obviously, many modifications and variations of the present invention are possible in the light of the above teachings. For example, the frequency deviation indicator section may be omitted in one model or the alternate timing pulse generator may be substituted for the series of timing multivibrators in another model. It is, therefore, to be understood that within the scope of the appended claims the invention may be practiced otherwise than specifically described.

What is claimed is:

1. A digital notch filter comprising: means, receiving an input signal, for generating a pulse at the beginning of each cycle of the input signal; means responsive to selected ones of said generated pulses for generating after each of said selected pulses a voltage level having a duration corresponding to the band width of the filter and at a duration after said selected pulses corresponding to the resonant frequency of the filter; and means responsive to the pulses following said selected pulses and said generated voltage levels for producing output signals only when said pulses following said selected pulses occur at times such that they are totally within the duration of said voltage levels whereby said output signals indicate that the frequency of the input signal is within the passband of said filter and can be used for gating the input signal to some desired location thereby enabling this filter to function with almost infinite rejection outside its passband and no attenuation in its passband.

2. A digital notch filter according to claim 1 including means responsive to the pulses following said selected pulses and said generated voltage levels for producing signals when the leading edges of said pulses following said selected pulses occur at times prior to said voltage levels thereby indicating that the frequency of the input signal is high compared to the resonant frequency of the filter.

3. A digital notch filter according to claim 1 including means responsive to the pulses following said selected pulses and said generated voltage levels for producing signals when the following edges of said pulses following said selected pulses occur at times after said voltage levels thereby indicating that the frequency of the input signal is low compared to the resonant frequency of the filter.

4. A digital notch filter according to claim 1 including means responsive to the pulses following said selected pulses and said generated voltage levels for measuring the frequency deviation of the input signal from the resonant frequency of the filter.

5. A digital notch filter comprising: means receiving an input signal for generating a short duration pulse at the beginning of each cycle of the input signal; means for generating, at the beginning of alternate one of said short duration pulses, a first series of voltages having durations equal to the reciprocal of the resonant frequency of the filter minus one-half of the passband of the filter minus a first predetermined length of time; means, responsive to said first series of voltages, for generating a second series of voltages such that each voltage begins at the termination of a voltage in said first series and ends said first predetermined length of time later; means, responsive to said second series of voltages, for generating a third series of voltages such that each voltage begins at the termination of a voltage in said second series and ends a length of time corresponding to said passband later; means, responsive to said third series of voltages, for generating a fourth series of voltages such that each voltage begins at the termination of a voltage in said third series and ends a second predetermined time later; and means, receiving said short duratiomg pulses and said second, third and fourth series of voltages, for determining which of said second, third, and fourth series of voltages said short duration pulses following said alternate ones coincide with whereby if said short duration pulses following said alternate ones coincide with said second series of voltages the frequency of said input signal is high compared to the resonant frequency of the filter, if the pulses coincide with said third series of voltages the frequency of the input signal is within the resonant frequency of the filter and if the pulses coincide with said fourth series of voltages the frequency of said input signal is low compared to the resonant frequency of the filter.

6. A digital notch filter according to claim 5 including means for digitally measuring the frequency deviation of the input signal from the resonant frequency of the filter.

References Cited

UNITED STATES PATENTS

| | | | |
|---|---|---|---|
| 2,943,261 | 6/1960 | Relis | 324—78(Q) |
| 3,230,461 | 1/1966 | Dix et al. | 324—78(Q)UX |

OTHER REFERENCES

L. K. Seith: IBM Tech. Discl. Bul., vol. 4, No. 11, April 1962.

ALFRED E. SMITH, Primary Examiner

U.S. Cl. X.R.

328—165